United States Patent
Singleton et al.

(10) Patent No.: US 6,683,761 B2
(45) Date of Patent: Jan. 27, 2004

(54) MAGNETORESISTIVE SENSOR WITH LAMINATE ELECTRICAL INTERCONNECT

(75) Inventors: Eric W. Singleton, Greenfield, MN (US); Kristin J. Duxstad, Eden Prairie, MN (US); Paul E. Anderson, Eden Prairie, MN (US)

(73) Assignee: Seagate Technology LLC, Scotts Valley, CA (US)

(*) Notice: Subject to any disclaimer, the term of this patent is extended or adjusted under 35 U.S.C. 154(b) by 169 days.

(21) Appl. No.: 09/981,765

(22) Filed: Oct. 17, 2001

(65) Prior Publication Data
US 2002/0055307 A1 May 9, 2002

Related U.S. Application Data

(60) Provisional application No. 60/247,664, filed on Nov. 9, 2000.

(51) Int. Cl.$^7$ ................................. G11B 5/33
(52) U.S. Cl. ................................. 360/324.11
(58) Field of Search ............... 360/314, 324.11

(56) References Cited

U.S. PATENT DOCUMENTS

| | | | |
|---|---|---|---|
| 4,650,696 A | 3/1987 | Raby | 427/89 |
| 5,052,103 A | 10/1991 | Saitou | 29/852 |
| 5,200,017 A | 4/1993 | Kawasaki et al. | 156/345 |
| 5,491,600 A | 2/1996 | Chen et al. | 360/113 |
| 5,539,256 A | 7/1996 | Mikagi | 257/763 |
| 5,540,820 A | 7/1996 | Terakado et al. | 204/192.3 |
| 5,742,459 A | 4/1998 | Shen et al. | 360/113 |
| 5,850,324 A | 12/1998 | Wu et al. | 360/113 |
| 5,883,764 A * | 3/1999 | Pinarbasi | 360/322 |
| 5,930,085 A | 7/1999 | Kitade et al. | 360/113 |
| 5,985,751 A | 11/1999 | Koyama | 438/637 |
| 6,043,142 A | 3/2000 | Nakajima et al. | 438/585 |
| 6,181,534 B1 * | 1/2001 | Gill | 360/324.11 |
| 6,219,208 B1 * | 4/2001 | Gill | 360/324.1 |
| 6,317,298 B1 * | 11/2001 | Gill | 360/324.11 |
| 6,407,890 B1 * | 6/2002 | Gill | 360/314 |
| 6,538,859 B1 * | 3/2003 | Gill | 360/324.12 |
| 6,556,390 B1 * | 4/2003 | Mao et al. | 360/324.1 |

OTHER PUBLICATIONS

"Electrical–Resistivity Model for Polycrystalline Films: The Case of Arbitrary Reflection at External Surfaces", by A.F. Mayadas et al., *Physical Review B*, vol. 1, No. 4, Feb. 15, 1970, pp. 1382–1389.
Specular Boundary Scattering and Electrical Transport in Single–Crystal Thin Films of CoSi$_2$, by J.C. Hensel et al., *Physical Review Letters*, vol. 54, No. 16, Apr. 22, 1985, pp. 1840–1843.
"Conduction in Metal Films", by M. Ohring, *The Materials Science of Thin Films*, 1992, pp. 455–561 and 505–506.
"Interconnect Limits on Gigascale Integration (GSI) in the 21$^{st}$ Century", by J. Davis et al., *Proceedings of the IEEE*, vol. 89, No. 3, Mar. 2001, pp. 305–324.
"The Conductivity of Thin Metallic Films According to the Electron Theory of Metals", by K. Fuchs et al., *Proceedings of the Cambridge Philosophical Society*, pp. 100–108 (1937).
*Advances in Physics A Quarterly Supplement of the Philosophical Magazine*, by E. Sondheimer, vol. 1, No. 1, pp. 1–42, (1952).

* cited by examiner

*Primary Examiner*—A. J. Heinz
*Assistant Examiner*—Mark Blouin

(57) ABSTRACT

An electrical interconnect is configured to provide an electrical connection between a first point and a second point. The interconnect includes a specular reflection layer adjacent a conductor layer. The conductor is configured to conduct electrons between the first and second points and the planar specular reflection layer confines the electrons to the conductor through specular reflection. This reduces electrical resistance of the electrical interconnect measured in a direction parallel with the specular reflection layer.

21 Claims, 3 Drawing Sheets

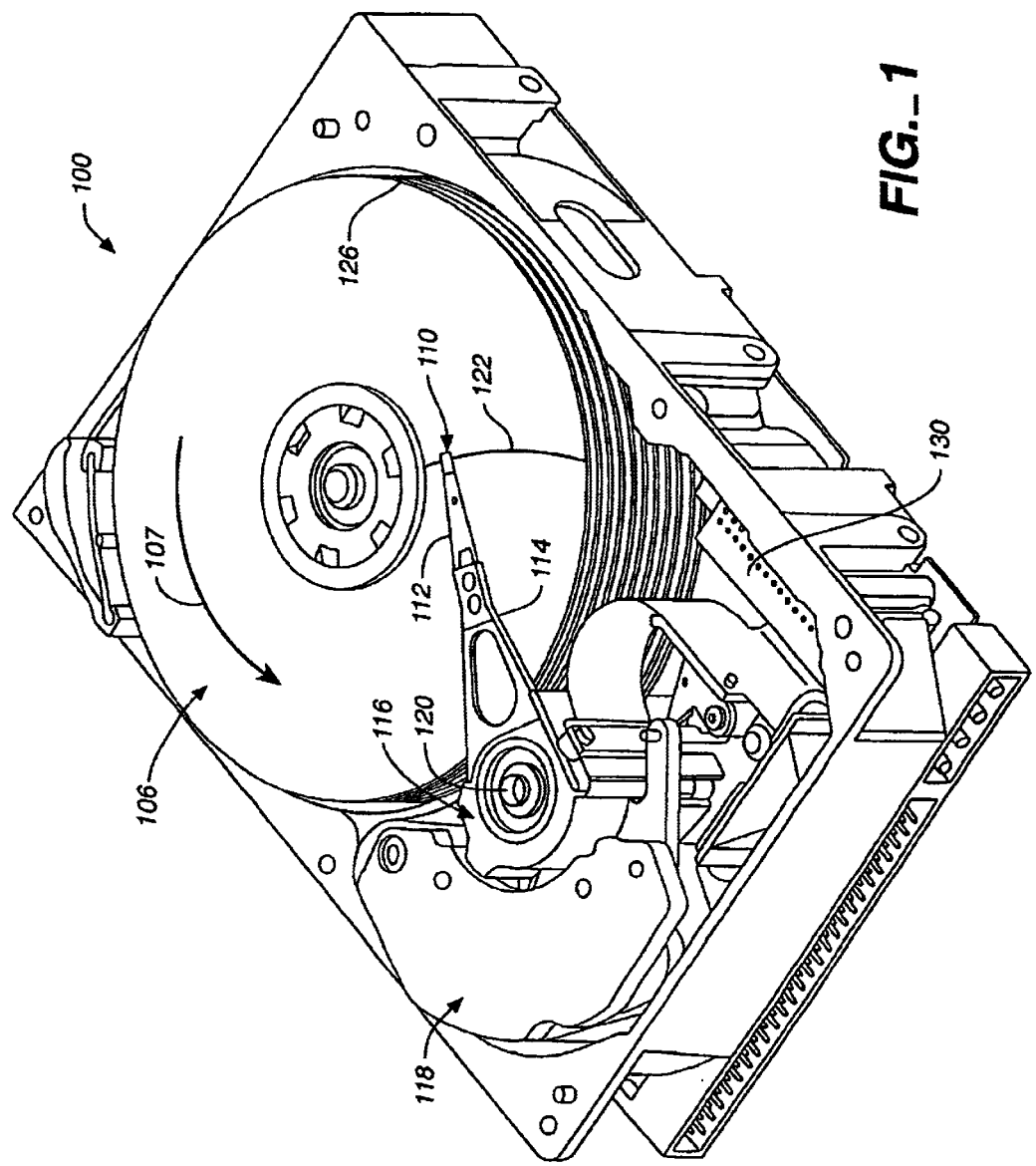
FIG._1

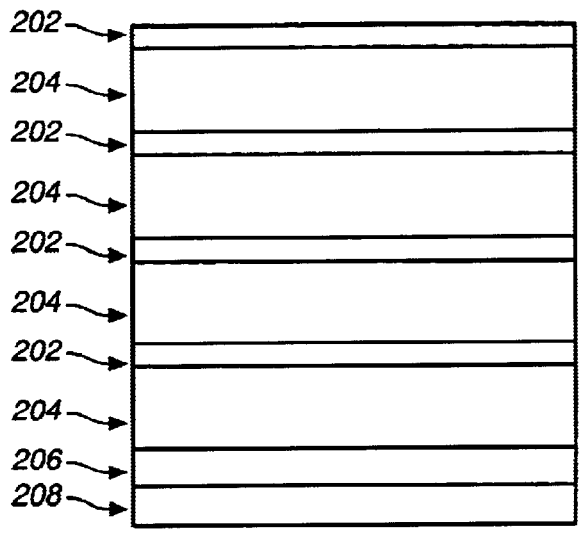
FIG._2
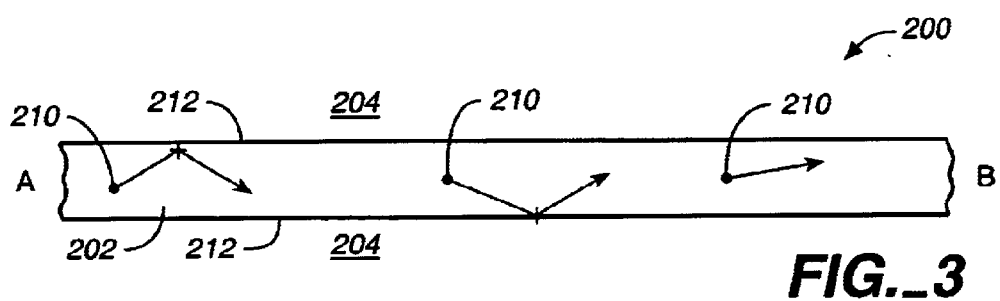
FIG._3
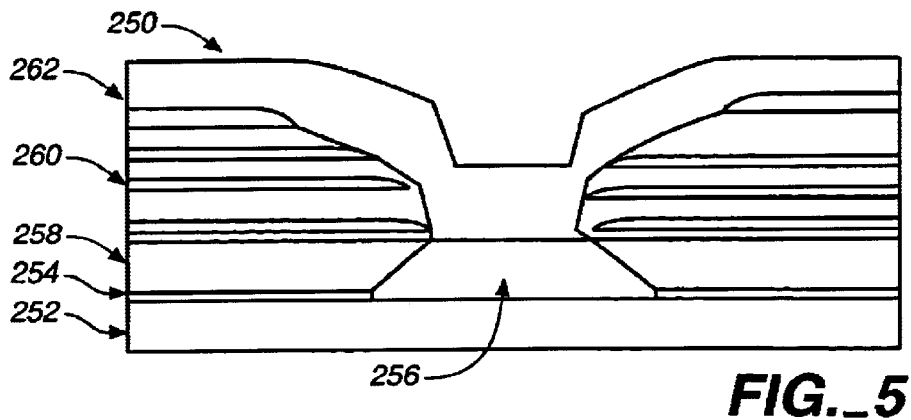
FIG._5

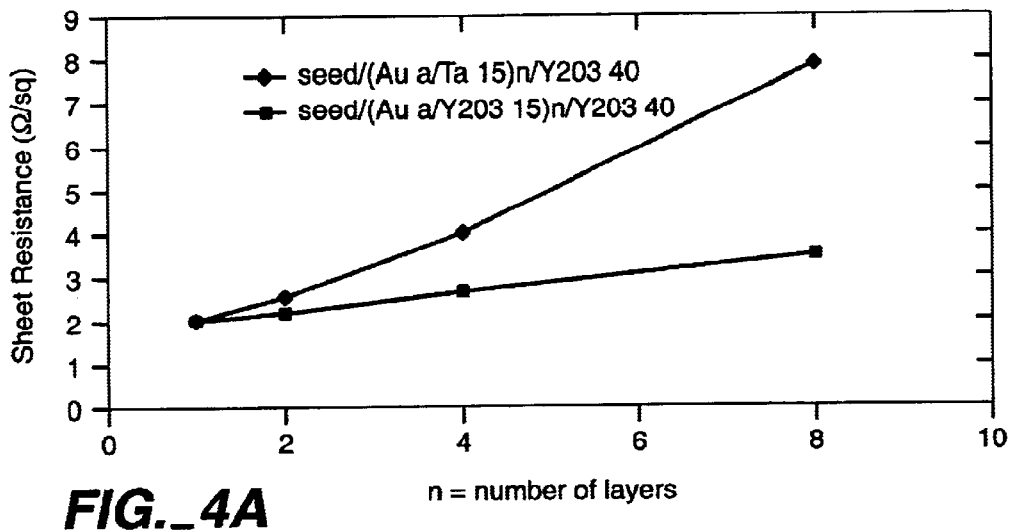
FIG._4A
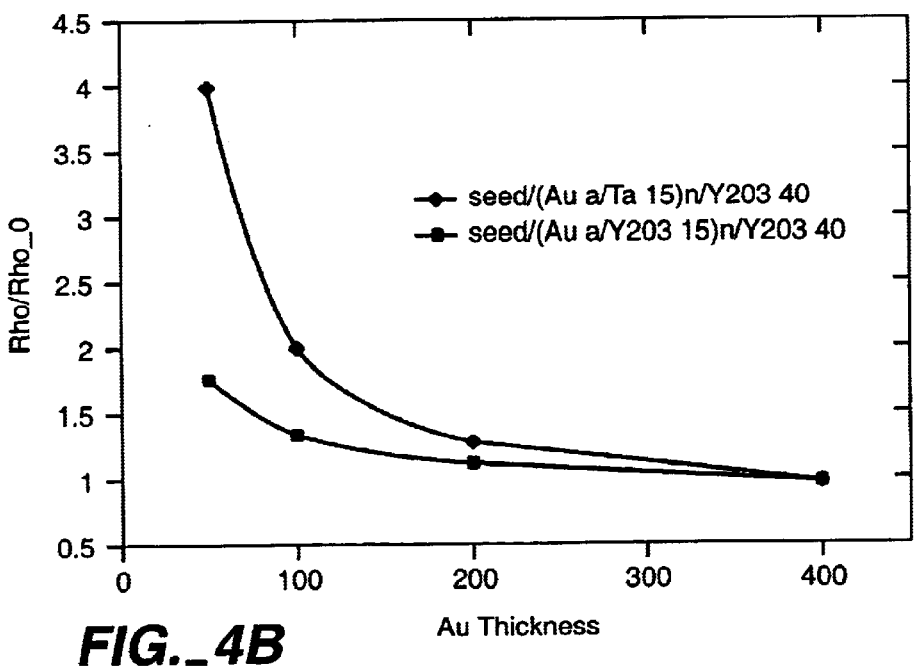
FIG._4B

MAGNETORESISTIVE SENSOR WITH LAMINATE ELECTRICAL INTERCONNECT

CROSS-REFERENCE TO RELATED APPLICATION

The present application is based on and claims the benefit of U.S. provisional patent application Ser. No. 60/247,664, filed Nov. 9, 2000, the content of which is hereby incorporated by reference in its entirety.

FIELD OF THE INVENTION

The present invention relates to storage systems. More specifically, the present invention relates to magnetoresistive sensors used in such storage systems.

BACKGROUND OF THE INVENTION

Magnetic storage systems are used to store magnetically encoded information. There has been an ongoing desire in such storage systems to increase the storage density. Frequently, steps toward this goal are achieved by reducing the size of various components. One such component is the transducer which is used to read and write information onto a storage medium. During writing, the transducer impresses a magnetic field onto the storage medium, for example, using an inductive coil in an inductive head. During readback, the written field is sensed using, for example, a magnetoresistive sensor.

In general, a decrease in the size of an electrical component causes an increase in the component's electrical resistance. This increased resistance causes attenuation of the signals which must be carried by or through the electrical components. Further, the increased resistance can cause electrical noise in small signals. As storage densities continue to increase, and the size of components continue to decrease, the increased resistance of the components is one of the limiting factors in the design and implementation of magnetic storage devices.

The present invention addresses these problems and offers other advantages over the prior art.

SUMMARY OF THE INVENTION

The present invention relates to electrical interconnects having reduced resistance thereby addressing the above-identified problem.

An electrical interconnect is configured to provide an electrical connection between a first point and a second point. The interconnect includes a planar specular reflection layer and a planar conductor is positioned adjacent the planar specular reflection layer. The planar conductor is configured to conduct electrons between the first and second points and the planar specular reflection layer confines the electrons to the planar conductor through specular reflection. This reduces electrical resistance of the electrical interconnect measured in a direction parallel with the plane.

BRIEF DESCRIPTION OF THE DRAWINGS

FIG. 1 is a top plan view of a disc storage system including an electrical interconnect in accordance with the present invention.

FIG. 2 is a side cross-sectional view of a laminated electrical interconnect in accordance with the present invention.

FIG. 3 is a diagram which illustrates operation of the electrical interconnect of the present invention.

FIG. 4A is a graph of sheet resistance ($\Omega$/sq) versus number of layers n.

FIG. 4B is a graph of effect resistivity versus conductor thickness.

FIG. 5 is a cross-sectional view of a spin valve using an electrical interconnect of the invention.

DETAILED DESCRIPTION OF ILLUSTRATIVE EMBODIMENTS

Referring now to FIG. 1, a disc drive storage system 100 with which the present invention is useful is shown. Disc drive 100 includes a disc pack 126 having storage surfaces 106. The disc pack 126 includes a stack of multiple discs and read/write head assembly 112 includes a read/write transducer or head 110 for each stacked disc. Disc pack 126 is spun or rotated as shown by arrow 107 to allow read/write head assembly 112 to access different rotational locations for data on the storage surfaces 106 on the disc pack 126.

Read/write head assembly 112 is actuated to move radially, relative to the disc pack 126, as shown by arrow 122 to access different radial locations for data on the storage surfaces 106 of disc pack 126. Typically, the actuation of read/write head assembly 112 is provided by a voice coil motor 118. Voice coil motor 118 includes a rotor 116 that pivots on axle 120 and an arm 114 that actuates the read/write head assembly 112. Disc drive 100 includes electronic circuitry 130 for controlling the operation of the disc drive 100 and transferring data in and out of the disc drive.

As data densities have increased, the size of the components of disc drive 100 have decreased. In particular, the size of the transducer head of disc drive 100 has decreased in comparison with prior art designs. As is known in the art, smaller components have higher electrical resistances. This increased electrical resistance can reduce signal strength and introduce noise into the system. This problem is present in devices other than disc storage systems, and in one aspect the present invention is applicable to electrical interconnects used in any type of electrical device.

The present invention includes a laminated electrical interconnect such as electrical interconnect 200 shown in cross-section in FIG. 2. Electrical interconnect 200 includes planar conductor layers 202 separated by planar specular reflection layers 204. In one aspect, the present invention includes one or more planar conductive layers adjacent to one or more planar specular reflection layers. At least one interface should be formed between a conductor layer and a specular reflection layer. The lower conductor 202 is deposited on seed layer 206 or seed layers 206 and 208. The lower conductor may be deposited on seed layers in order to enhance, define or control the material structure. The seed layer may be chosen to enhance for instance a decreased resistivity of the conductor layer. The seed layer may also be chosen for instance to define or control film adhesion, stress or other mechanical or electrical properties.

The configuration illustrated in FIG. 2 provides an electrical interconnect between the sides of interconnect 200 (i.e., in parallel with the planes defined by the layers) having a reduced electrical resistance in comparison to designs in which the conductive layers are either not separated, or are separated by layers which diffusely scatter electrons rather than specularly reflect electrons.

FIG. 3 illustrates operation of the laminate structure of the invention. In FIG. 3, electrons 210 move in a direction from point A to point B through planar conductor 202. Specular reflective layers 204 form interfaces 212 with conductor layer 202. The reflection at interfaces 212 effectively provide "mirrors" to the electrons 210. The electrons "bounce" off the interface 212 and continue with the same momentum in the direction toward point B. The reflective property of this interface is a function of the specularity of specular reflective layers 204. These layers can be viewed as providing a guide to electrons 210 to guide the electrons from point A toward point B without losing momentum.

The resistivity is reduced in the conductor 202 leading to longer mean free paths for the conduction electrons 210. Note that this configuration can provide improved thermal, chemical and mechanical reliability in the interconnect. Improved thermal properties can be realized in that the improved electrical conductivity of the conductor layer as a result of the enhanced specularity of the structure will also result in improved thermal conductivity of the same material as compared to the material with interfaces that scatter electrons diffusely. Improvement in chemical and mechanical reliability or properties of the interconnect can be realized by forming multilayer interconnect structures in comparison to single layer structure of the conductor layer. The mirroring effect at interfaces 212 can also serve to confine the conduction electrons to the conductor layer 202. Although this specification and the following claims use the term "planar", the actual components may not be planar on a macroscopic level.

Although any conductive material can be used for conductor 202, in one specific example elemental Cu, Au, Ag, W or Rh is employed. Further, the specular reflection layers 204 can be any appropriate material having a desired specularity. However, specific examples include $Y_2O_3$, $HfO_2$, MgO, $Al_2O_3$, NiO, $Fe_2O_3$, $Fe_3O_4$. Additionally, in some embodiments it may be desirable to provide a small amount of additional material to the conductor layers to provide other properties to the layers, for example, to improved thermal properties. An example of additional materials include Ti, Ta or Zr.

In experiments, the electrical resistivity of laminated interconnect structures have been found to be reduced when the laminate structure uses thin oxide layers which have high specular reflectivity. In one test, an interconnect was formed using a seed layer of Ta followed by a conductor layer of Au, a specular layer of $Y_2O_3$, a conductor of Au and a specular layer of $Y_2O_3$. Substantially lower sheet resistance and resistivity in comparison to structures having no laminate, or structures with non-specular laminates. A resistance decrease of 55% has been observed in some laminate structures as described here.

FIG. 4A is a graph of sheet resistance versus number of layers for multilayer structures, of Au/Ta and Au/$Y_2O_3$. The sheet resistance of a seed/(Au a/$Y_2O_3$ 15)n, and seed/(Au a/Ta 15)n series of samples where a=50, 100, 200 and 400 Angstrom and the product a*n is constrained to be 400 Angstrom for all data points. The laminate contact with the highly specular scattering layer ($Y_2O_3$) sheet resistance is significantly lower than laminate contact with the non specular scattering laminate layers (Ta laminate) for Au thickness below 400 Angstroms. The beneficial effect of the high specularity is enhanced when the Au thickness approaches and falls below the thickness of the electron mean free path length in the conductor layer, Au.

FIG. 4B is a graph showing effective or relative resistivity versus thickness of the conductor layer. FIG. 4B illustrates that as the thickness of the conductor layer increases, the resistance of the interconnect approaches the bulk resistance of the material.

FIG. 5 is a cross-sectional view of a spin valve/giant magnetoresistive sensor 250 which can be used, for example, in the disc drive system of FIG. 1. Sensor 250 includes a lower gap layer 252 with a seed layer 254 deposited thereon. A spin valve layer 256 is also deposited on gap 252 between two permanent magnets 258. A laminated electrical interconnect 260 having specular reflective layers in accordance with the present invention is deposited on permanent magnet 258 and configured to form an electrical contact with spin valve layer(s) 256. A top gap layer 262 overlies the structure and provides an electrically isolating layer between the sensor 250 and the shield structure (this is not shown in the figure) As the size of the spin valve is decreased in order to accommodate recording densities, the size of the electrical interconnects 260 is also reduced. However, using the laminate interconnect of the invention, the resistivity of the interconnects 260 can be reduced. This can increase signal strength and reduce the noise present in readback signals.

In one aspect, a relationship is provided between the specularity of the specular reflection layer and the thickness of the conductor layer. For example, using the formalism developed by Fuchs in 1938 (see K. Fuchs, *Proc. Cambridge Phil. Soc.*, 34, 100, (1938) and elaborated on by other investigators such as Sondheimer (see, E. H. Sondheimer, *Advan. Phys.*, 1,1, (1951). The Fuchs-Sondheimer theory can be utilized to provide a characterization of the specular nature of the multilayer films described here. A conductor surface may scatter an electron in an admixture of both specular and diffuse contributions, with P being the fraction of surface scattering events that are specular. For purely diffuse scattering, P=0, and for purely specular scattering, P=1. For P=1, the film resistivity would be equal to the bulk resistivity irrespective of the film thickness. For specularity less than one, the resistivity of the film increases as thickness decreases below the electron mean free path for that material and temperature.

An electrical interconnect 200 is provided which provides an electrical connection between a first point (A) and a second point (B). First and second planar specular reflection layers 204 extend in respective first and second planes. The specularity (P) of these layers has been estimated to be more than about 0.6 as formed here. A planar conductor 202 is positioned between the first and second planar specular reflection layers. The planar conductor can have a thickness of less than about 1.5 to 2 times the electron mean free path for P=0.5 to 0.6 with a reduction in film resistivity observable. In general, the mean free path is the average distance an electron travels between collisions with other particles. For P>0.6, an improvement in film resistivity will be observable for thicker films. For P<0.5, the film thickness for observable reduction in resistivity will be nearer the electron mean free path length in the conductor material. The specular reflection layers 204 act to confine electrons 210 to the planar conductor layer 202 to thereby reduce the electrical resistance of the electrical interconnect 200 when measured in a direction parallel with the planes of the specular reflection layers 204. In various aspects, the specular reflection layers can comprise oxides, the planar conductor can be selected from the group of conductors consisting of Cu, Au, Ag, W and Rh. The planar specular reflection layers can be selected from the group of specular reflection layers consisting of $Y_2O_3$, $HfO_2$, MgO, $Al_2O_3$, NiO, $Fe_2O_3$ or $Fe_3O_4$. The conductor can be configured to have particular thermal properties, for example, through introducing Ti, Ta or Zr. A spin valve 250 is also provided which includes an electrical interconnect 260. The various layers can be deposited on a seed layer such as seed layers 206 or 208. A cap layer 262 can overlay the interconnect. In spin valve 250, the electrical interconnect can be positioned proximate a permanent magnet 258 of the spin valve. A disc storage system 100 is also provided which includes spin valve 250 having the electrical interconnect 260 of the invention. In a method of making an electrical interconnect of the present invention, a first and second specular reflection layers 204 is deposited and a planar conductor is deposited therebetween. The electrical/specular multilayers can be single or multiple repeats of the structure.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the electrical interconnect while maintaining substantially the same functionality without departing from the scope and spirit of the present invention. In addition, although the preferred embodiment described herein is directed to a transducer for a magnetic system, it will be appreciated by those skilled in the art that the teachings of the present invention can be applied to other systems, where electrical interconnects are used such as in integrated circuits or other small electrical components without departing from the scope and spirit of the present invention. The invention can be used with sensors other than with spin valves as illustrated including top, bottom and dual spin valves. Further, other magnetic sensors such as AMR sensors, tunnel junctions, super lattice GMR sensors, etc. can utilize the invention. The conductor/contact structure can be used in other applications, for example with other types of magnetic sensors, other types of read heads, for environments other than discs, etc. The interconnect of the present invention can be used for any type of electrical interconnect including small solid state devices such as integrated circuits for both digital or analog circuitry. The specularity of the specular reflection layers can be more than 0.6, more than 0.5, or any appropriate value for a desired implementation. The thickness of the conductor layer can be less than 1.5 or less than 2 times the electron mean free path of the conductor material. However, other thicknesses can be used as appropriate for a desired implementation.

What is claimed is:

1. An electrical interconnect configured to provide an electrical connection between a first point and a second point, comprising:
   a first specular reflection layer having a specularity of more than about 0.5;
   a second specular reflection layer having a specularity of more than about 0.5; and
   a conductor between the first and second specular reflection layers having a thickness of less than about 2 times the electron mean free path of the conductor, wherein the conductor is configured to conduct electrons between the first and second points and the first and second specular reflection layers confine the electrons to the conductor through specular reflection to thereby reduce electrical resistance of the electrical interconnect measured between the first and second points.

2. The apparatus of claim 1 wherein the first and second specular reflection layers comprise oxides.

3. The apparatus of claim 1 wherein the conductor is selected from the group of conductors consisting of Cu, Au, Ag, W and Rh.

4. The apparatus of claim 1 wherein the first and second specular reflection layers are selected from the group of specular reflection layers consisting of Y2O3, HfO2, MgO, Al2O3, NiO, Fe2O3 or Fe3O4.

5. The apparatus of claim 1 wherein the conductor includes a material to promote thermal conductivity.

6. The apparatus of claim 5 wherein the material is selected from the group of materials consisting of Ti, Ta and Zr.

7. The apparatus of claim 1 including a seed layer which is a specular scattering layer.

8. The apparatus of claim 1 including a cap layer which is a specular scattering layer.

9. The apparatus of claim 1 wherein the specularity of the first and second specular reflection layers is more than about 0.6.

10. The apparatus of claim 1 wherein the thickness of the electrical conductor layer is less than about 1.5 times the electron mean free path of the conductor.

11. A spin valve structure including an electrical interconnect in accordance with claim 1.

12. The apparatus of claim 11 wherein the electrical interconnect is positioned proximate a permanent magnet layer.

13. The apparatus of claim 11 wherein the electrical interconnect is positioned proximate a stabilizing antiferromagnetic layer.

14. A disc storage system including a spin valve in accordance with claim 11.

15. A method of making an electrical interconnect to produce an electrical connection between a first point and a second point, comprising:
   (a) depositing a first specular reflection layer, the first reflection layer having a specularity of more than about 0.5;
   (b) depositing a second specular reflection layer having a specularity of more than about 0.5; and
   (c) depositing a conductor between the first and second specular reflection layers having a thickness of less than about 2 times the electron mean free path of the conductor, wherein the conductor is configured to conduct electrons between the first and second points and the first and second specular reflection layers confine the electrons to the conductor through specular reflection to thereby reduce electrical resistance of the electrical interconnect measured between the first and second points in a direction parallel with the first and second planes, wherein the steps (a), (b) and (c) are carried out in any order.

16. The method of claim 13 wherein the first and second specular reflection layers comprise oxides.

17. The method of claim 13 wherein the planar conductor is selected from the group of conductors consisting of Cu, Au, Ag, W and Rh.

18. The method of claim 13 wherein the first and second specular reflection layers are selected from the group of specular reflection layers consisting of Y2O3, HfD2, MgO, Al2O3, NiO, Fe2O3 and Fe3O4.

19. An electrical interconnect made in accordance with the method of claim 15.

20. A spin valve including the electrical interconnect of claim 19.

21. An electrical interconnect configured to provide an electrical connection between a first point and a second point, comprising:
   a conductor extending between the first point and the second point, the conductor configured to conduct electrons therebetween; and
   specular reflection means forming an interface with the electrical conductor for reflecting and confining the electrons in the electrical conductor.

* * * * *

UNITED STATES PATENT AND TRADEMARK OFFICE
CERTIFICATE OF CORRECTION

PATENT NO. : 6,683,761 B2
DATED : January 27, 2004
INVENTOR(S) : Singleton et al.

It is certified that error appears in the above-identified patent and that said Letters Patent is hereby corrected as shown below:

Column 6,
Line 51, delete "HfD2" and insert -- $HfO_2$ --.

Signed and Sealed this

Twenty-fifth Day of January, 2005

JON W. DUDAS
*Director of the United States Patent and Trademark Office*